United States Patent [19]
Landa Cosio

[11] Patent Number: 5,899,809
[45] Date of Patent: May 4, 1999

[54] DIGITAL BODY INTERFACE APPARATUS

[76] Inventor: Nicolas Arrioja Landa Cosio, 30 Oriente #420, Puebla, Puebla, Mexico, CP 72290

[21] Appl. No.: 08/869,509

[22] Filed: Jun. 5, 1997

Related U.S. Application Data

[60] Provisional application No. 60/019,744, Jun. 10, 1996.

[51] Int. Cl.⁶ .................................................. A63B 69/34
[52] U.S. Cl. .................................. 463/8; 463/37; 482/84
[58] Field of Search .................................. 463/36, 37, 7, 463/8; 364/410; 482/12, 83, 84; 473/455, 456, 570, 436; 73/862, 624

[56] References Cited

U.S. PATENT DOCUMENTS

| | | | |
|---|---|---|---|
| 4,728,100 | 3/1988 | Smith | 272/93 |
| 5,076,584 | 12/1991 | Openiano | 273/148 B |
| 5,139,261 | 8/1992 | Openiano | 273/148 B |
| 5,288,078 | 2/1994 | Capper et al. | 273/148 B |

FOREIGN PATENT DOCUMENTS

| | | |
|---|---|---|
| 4-276281 | 10/1992 | Japan . |
| 5-161761 | 6/1993 | Japan . |

*Primary Examiner*—Jessica J. Harrison
*Assistant Examiner*—John Paradiso
*Attorney, Agent, or Firm*—Robert Platt Bell & Associates, P.C.

[57] ABSTRACT

A digital body interface apparatus for use in playing an amusement video game is disclosed. The apparatus provides a unique array of infrared beams and push buttons to achieve a full body interaction between a playing participant and a computer-controlled video game. The apparatus utilizes an infrared beam at the front of each padded target place to detect a punch or a kick by a player. In the preferred embodiment, a padded target is provided with a hollow cavity through which the infrared beam passes. When the target is punched or struck, the cavity is at least partially collapsed, interrupting or attenuating the infrared beam. As with other games, adequate enclosure spaces for a video monitor, a coin mechanism, audio effects, and other necessary hardware, are incorporated.

16 Claims, 13 Drawing Sheets

DIGITAL BODY INTERFACE APPARATUS

CROSS-REFERENCE TO RELATED APPLICATIONS

This application claims priority from Provisional U.S. patent application Ser. No. 60/019,744 filed Jun. 10, 1996 and incorporated herein by reference.

FIELD OF THE INVENTION

The present invention relates to an amusement apparatus (e.g., video game) which provides a unique array of fixed digital body interfaces to achieve a full body interaction between a playing participant and a computer-controlled video game.

BACKGROUND OF THE INVENTION

The design of the video game control has changed dramatically in recent years. Prior-art control interfaces were popularly designed with hand-actuated control mechanisms, such as joysticks and trackballs, and the like.

To create a more kinematic experience for a participating player, arrays of pushed, toggled, or otherwise physically actuated switches, have sometimes been deployed within a defined playing space. For example, Japanese Publication No. 5-161761, published Jun. 29, 1993 (Yamoka) discloses a game platform interfaced to a television game machine. A playing participant typically stands on the game platform while watching a game on a TV monitor.

The game platform has an array of pressure switches, placed within reach by hands or feet, for the playing participant to selectively press during the progression of a game. However, a sense of interactive realism may be hampered because of the inevitable visual and tactile perceptions of the playing environment in locating and actuating such physically manipulated switches. This undesirable awareness becomes especially problematic for kinematic video games.

Capper et al., U.S. Pat. No. 5,288,078, issued Feb. 22, 1994, discloses a control interface apparatus which addresses the above concerns. As illustrated in FIG. 1, the prior-art control apparatus comprises a plurality of signal transceivers which may allow a participating player to interactively play a video boxing game with a video character. The Capper et al. apparatus is infrared sensor based, and may be used as a controller interface for use with a video game machine.

However, the prior-art apparatus of Capper et al. is not perfect, and may not be easy to troubleshoot. As illustrated in FIG. 1, a shielding partition may be required to shield infrared transmitters from infrared receivers. A multiplicity of radiated infrared signals directed to a playing space may confuse infrared transceivers as to the source of a reflected infrared signal. For a boxing type game, infrared transceivers must be thoughtfully directed with respect to a playing space, otherwise a player's left punch may not be distinguishable from the player's right punch by the infrared signal receivers.

Moreover, as illustrated in FIG. 1, the apparatus of Capper does not provide a surface for the player to contact with boxing gloves, hands, feet, or the like. Thus, the player is reduced to mere shadow boxing, and no tactile feel is provided of hitting an actual surface or person.

Heretofore, these prior-art interface devices were either lacking in interactive realism in interfacing with a participating player, or efforts to add a sense of interactive realism were cumbersome or proved imperfect in ordinary operations.

What is then required is a new and improved digital body interface apparatus to more effectively bring about a sense of interactive realism to video game playing. It must be easy to deploy, aesthetically simple, and durable for commercial use. But most of all, it must add to the sense of interactive realism to a participating player without the aid of loose accessories, platforms, body gear, or other sensory distractions.

SUMMARY AND OBJECTS OF THE INVENTION

The present invention contemplates a new and improved digital body interface apparatus to more effectively bring about a sense of interactive realism to video game playing. The digital body interface apparatus comes in a readily transportable package that may be easily assembled for operation without the added clutter of loose attachments, accessories, gloves, joysticks, or trackballs. Because the new design is easy to deploy, aesthetically simple, and durable, yet provides a sense of interactive realism for a participating player, it may be readily manufactured and commercialized for profitable ventures in public amusement.

Infrared sensors are located in contact cavities in the game enclosure or housing. Actions by a player (e.g., kicking, punching, or the like) may interrupt an infrared beam, thus indicating to the game control that a player movement has been made. In the preferred embodiment of the present invention, an infrared light beam may travel through a cavity within a foam target pad. When the target pad is struck, the beam may be interrupted or attenuated, indicating a hit has occurred. The foam target pad provides a tactile sense of realism and amy also prevent injury to the player.

It is an object of the present invention to provide a unique digital body interface apparatus to engender a sense of interactive realism for video game playing.

It is a further object of the present invention to utilize an array of infrared beam switches for out-of-sight and touchless interactive switching.

It is a further object of the present invention to provide an aesthetic hardware enclosure with a mix of target places and push-button controls.

It is a further object of the present invention, to provide an inexpensive, reliable, and easily fabricated contact pad for generating a signal when struck by a player.

BRIEF DESCRIPTIONS OF THE DRAWINGS

DETAILED DESCRIPTION OF THE INVENTION

Figure 1:
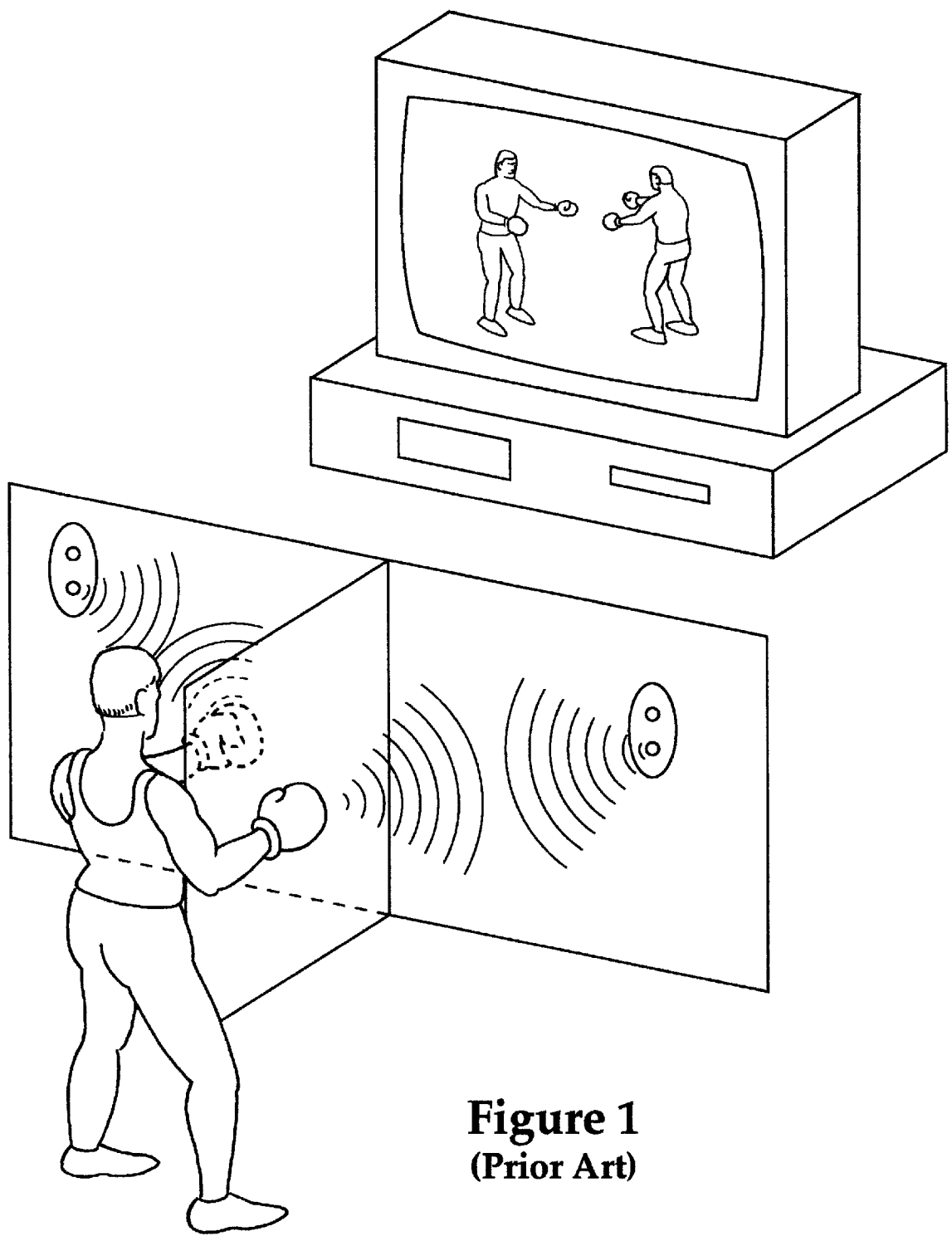
FIG. 1 is a perspective view of a player demonstratively interacting with a prior-art interface apparatus.
Figure 2:
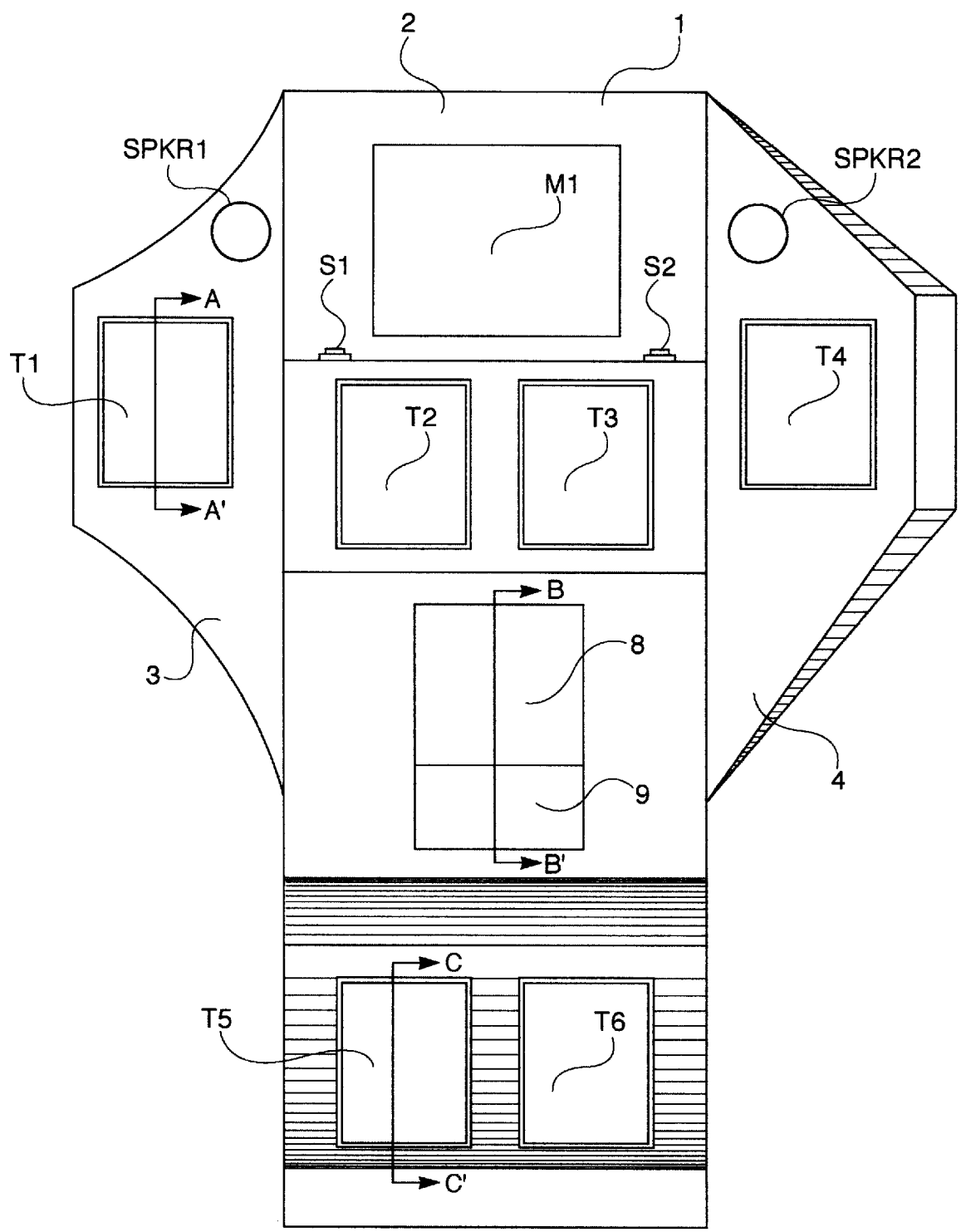
FIG. 2 is a front view of a digital body interface apparatus.

FIG. 2 illustrates a front view of a digital body interface apparatus 1. The digital body interface apparatus 1 is an amusement system comprising a physical structure and electronic circuits integrally designed to achieve a full body interaction between a game player and a computer. The physical structure may be comprised of wooden or fiberglass materials. Composite and plastic materials may also be used.

As illustrated in FIG. 2, the physical structure may comprise a large central box 2 with a wing 3 attached to its left side and another wing 4 attached to its right side. The central box 2 may have four padded target places, T2, T3, T5, and T6; a door 8 for a coin mechanism 10, including a coin box 9; and two push buttons S1 and S2. The central box 2 may be designed large enough to fully contain and provide interfaces for a game computer, viewing monitor M1, sound system, power supply, and other equipment and accessories. The central box 2 may also incorporate digital body interface circuits. The electronic hardware may be commercially available off-the-shelf items.

The right wing 4 is illustrated in FIG. 2 to illustrate a slight perspective view as a result of the wing being fixedly attached with the free end drawn forward 30 degrees with respect to the front face of the central box 2. The free end of the left wing 3 is equally drawn forward by 30 degrees with respect to the front face of the central box 2, although not illustrated as a perspective view.

Each wing holds a target place T1 or T4. An audio speaker SPKR1 or SPKR2 may also be incorporated into each wing. As suggested in FIG. 3, the angled wing attachments 3 and 4, in combination with the central box 2, may engender certain multidimensional effects to a participating player.

Figure 4:
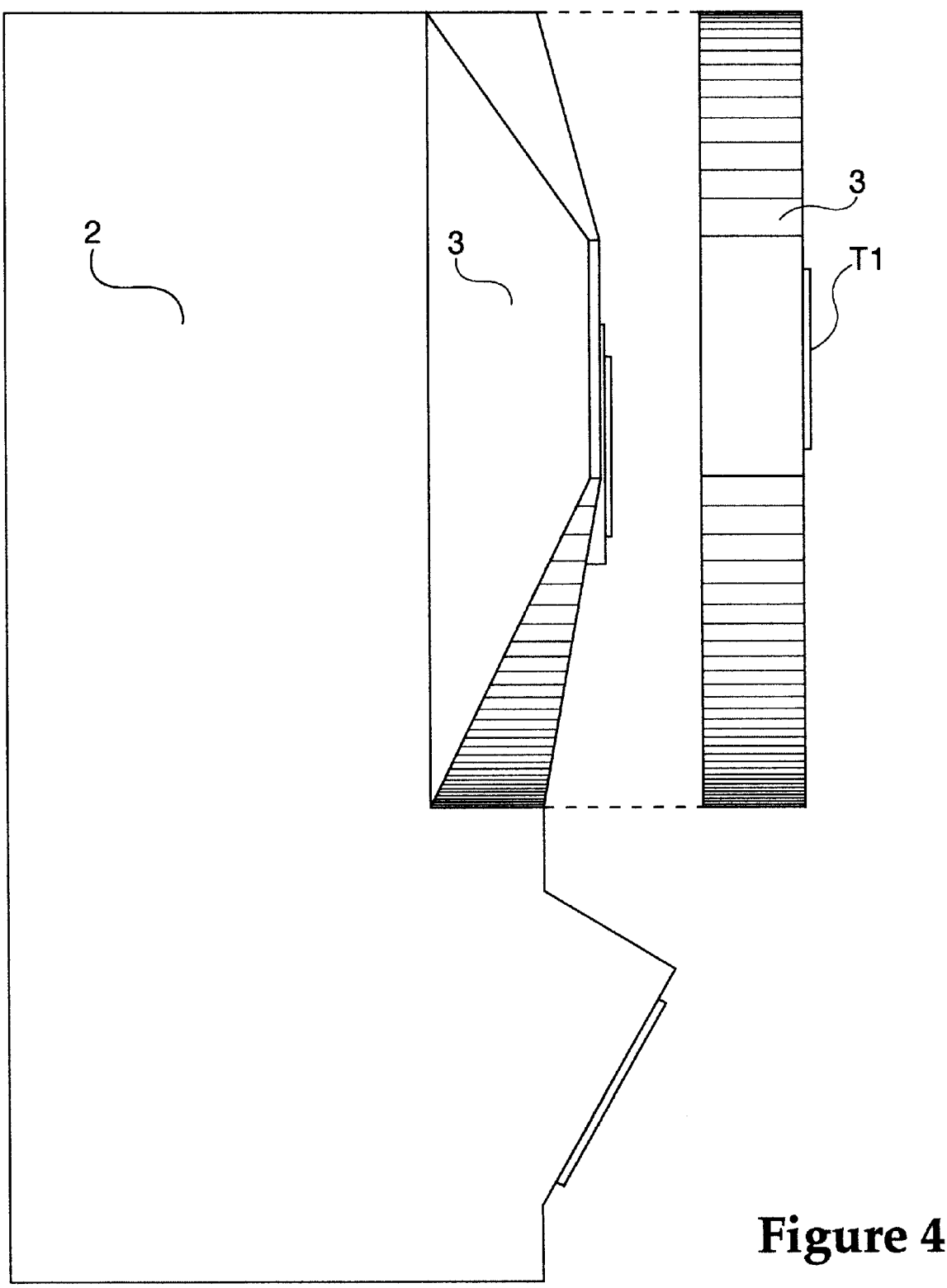
FIG. 4 is a side view of a digital body interface apparatus.

FIG. 4 shows a side view of a digital body interface apparatus 1 and a separate side view of a wing 3. The wing 3 is illustrated angled to the front and symmetrically tapered from the top and bottom points of attachment toward the free end.

Figure 10:
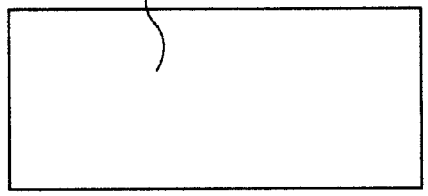
FIG. 10 is a side view of a high density foam pad.
Figure 9:
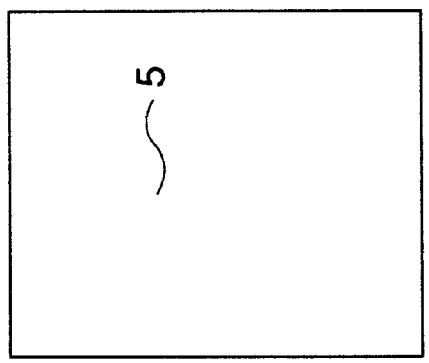
FIG. 9 is a front view of a high density foam pad.

An infrared (IR) beam system may be placed towards the front of the target places T1–T6 to allow a free space for an IR beam formation. A foam pad 5 may be placed to the rear of a target place, immediately following the placement of an infrared (IR) beam system. The target places T1–T6 may each be made of a high density foam pad 5. The front and side views of a foam pad 5 is illustrated in FIGS. 9 and 10, respectively.

Figure 3:
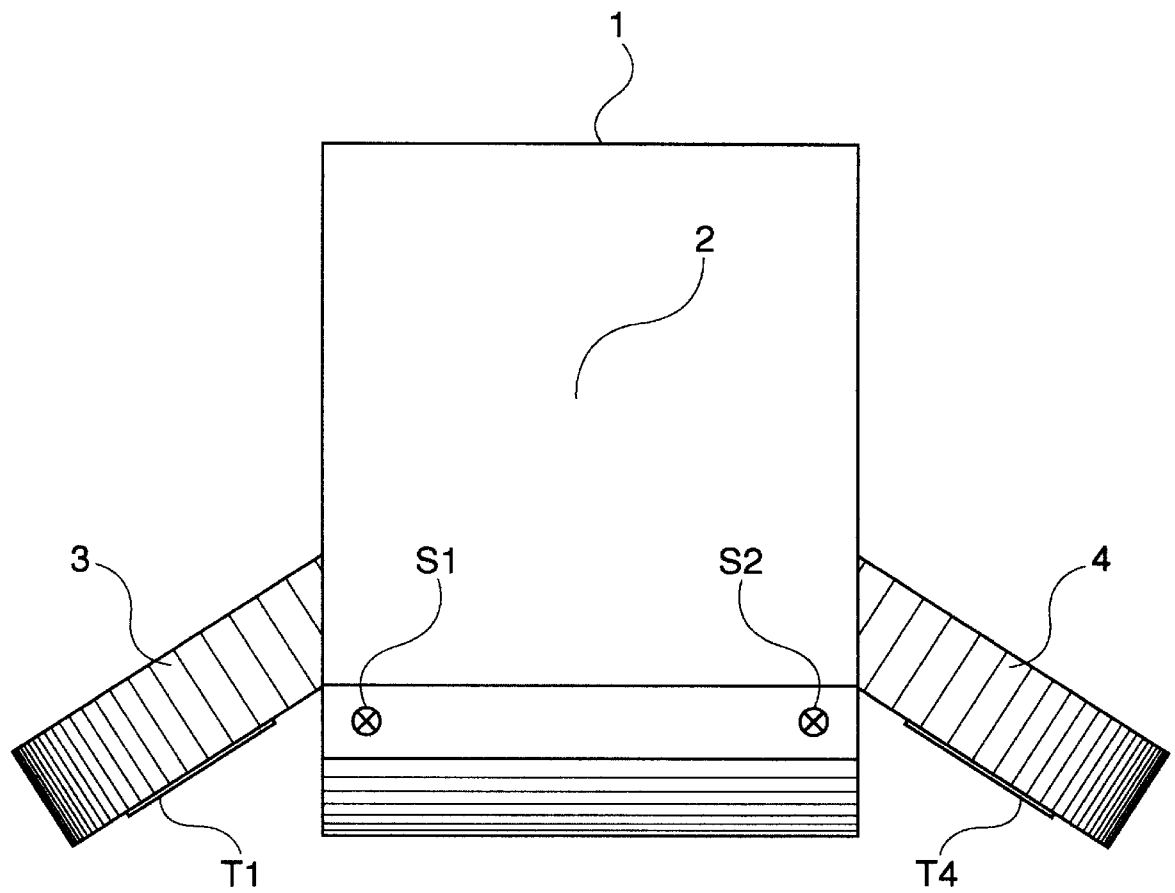
FIG. 3 is a top view of a digital body interface apparatus.

Illustrated in FIG. 3 are two visible push buttons S1 and S2. The push buttons S1 and S2 may each be actuating a normally-open SWST microswitch.

Figure 5:
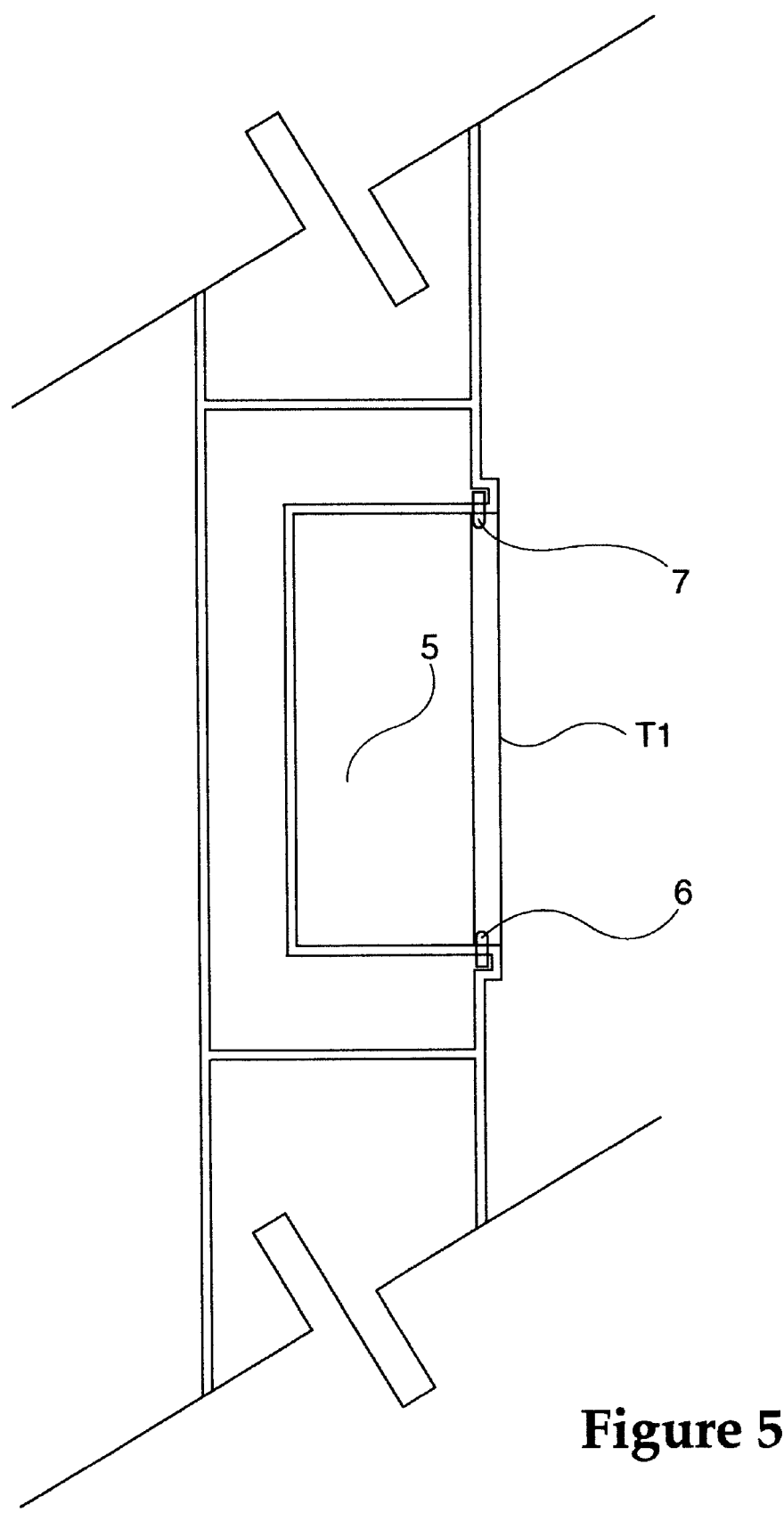
FIG. 5 is a cross-section view along line A–A' of a digital body interface apparatus.

Cross-section view along line A–A' of target place T1 is illustrated in FIG. 5. As illustrated in FIG. 5, the IR beam system may comprise an IR transmitter 6 and an IR receiver 7. IR transmitter 6 is illustrated in FIG. 5 as being arbitrarily placed at the bottom of the target place T1. IR receiver 7 is illustrated in FIG. 5 as being arbitrarily placed at the top of the target place T1. This arrangement is for illustrative purpose. Other variations with an IR beam crossing a target place T1–T6 will work equally well.

Figure 7:
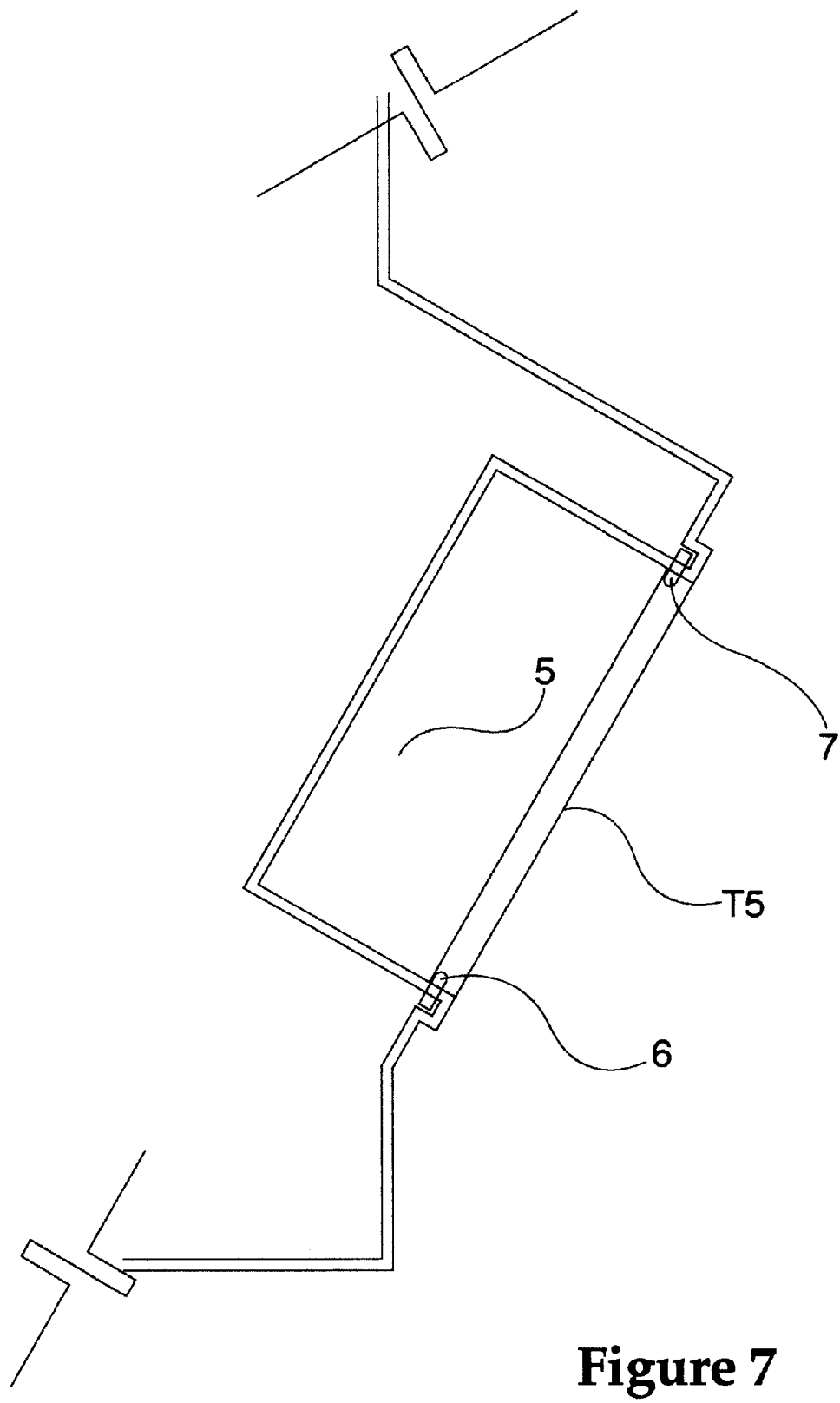
FIG. 7 is a cross-section view along line C–C' of a digital body interface apparatus.

As in FIG. 5, cross-section view along line C–C' of target place T5 is similarly illustrated in FIG. 7. As illustrated in FIG. 7, the IR beam system may similarly comprise an IR transmitter 6 and an IR receiver 7. As before, this arrangement is for illustrative purposes. Other variations with an IR beam crossing a target place T1–T6 will work equally well.

Figure 6:
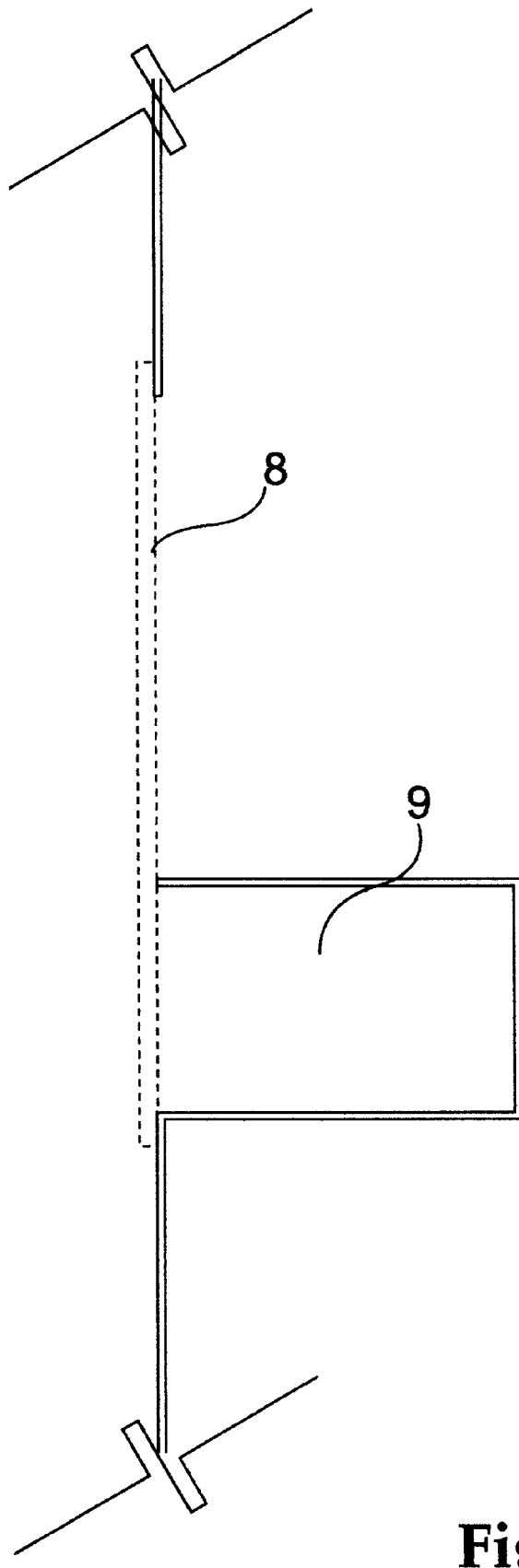
FIG. 6 is a cross-section view along line B–B' of a digital body interface apparatus.
Figure 8:
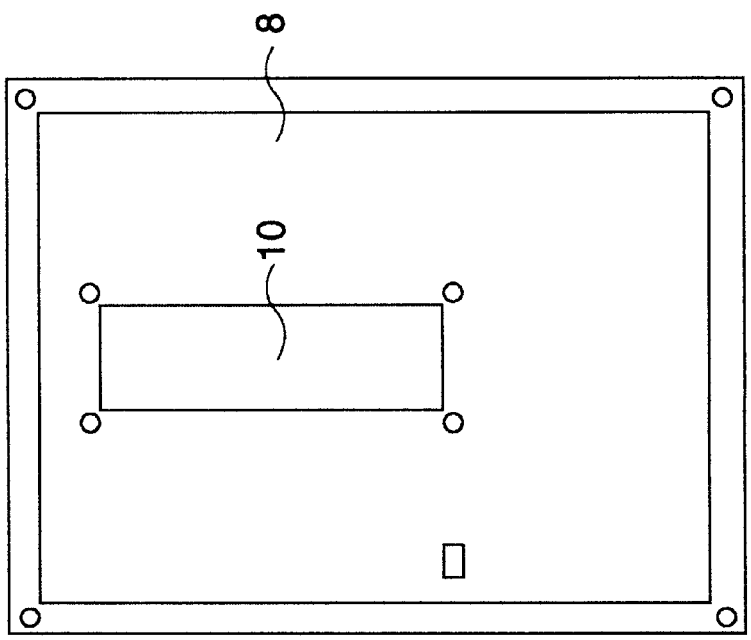
FIG. 8 is a front view of a door for a coin mechanism.

The digital body interface apparatus 1 may be coin operated for commercial use. Illustrated in FIG. 2 is a door 8 enclosing a coin mechanism. FIG. 6 shows a cross-section view along line B–B'. FIG. 8 shows a front view of the door 8 for a coin mechanism 10.

OPERATION OF THE DIGITAL BODY INTERFACE APPARATUS

The digital body interface apparatus 1 may provide a high level of kinematic interaction between a player and a video game. The digital body interface apparatus 1 may allow rapid body movements in interacting with a video game.

A digital body interface apparatus 1 has six target places and two push buttons. Four target places T1–T4 may be targeted with hands. Two push buttons S1 and S2 may be pressed with hands. Two target places, T5 and T6, may be targeted with feet. A player may selectively punch or kick several target places T1–T6 at will. A player may also selectively press the two push buttons S1 and S2 at will.

Each target place T1–T6 is crossed by an IR beam. When a player punches/kicks a target place, an IR beam is cut. When a player cuts a beam, an electronic circuit detects it and sends a signal to a game computer. The cut of an IR beam is therefore an input to a game computer.

THE DIGITAL BODY INTERFACE CIRCUITS

Figure 11:
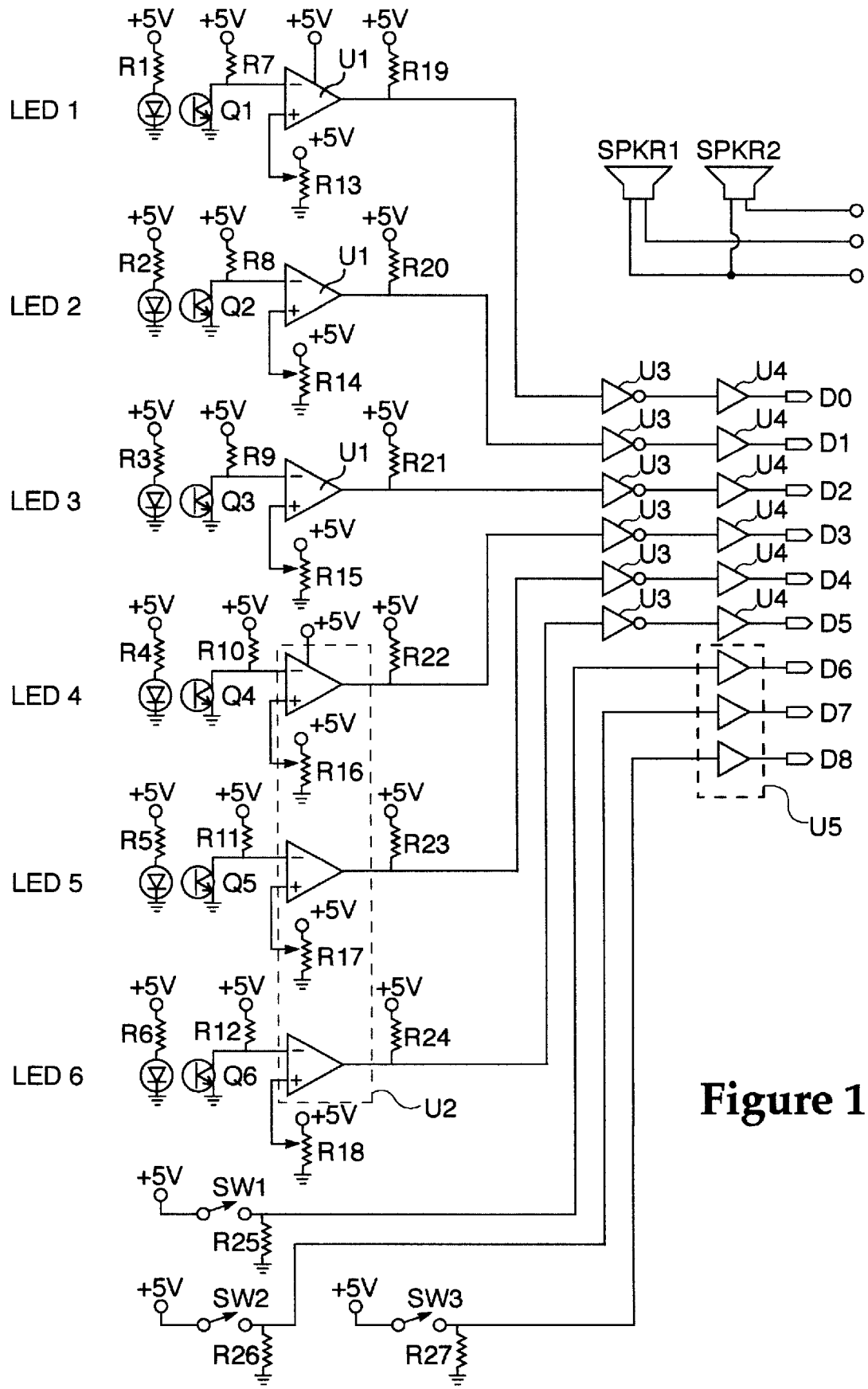
FIG. 11 is a schematic diagram of the digital body interface circuit system.

Electronic circuits for a digital body interface apparatus 1 are illustrated in FIG. 11 as a schematic diagram. The electronic circuits are used to detect a cut of an IR beam by a player. The electronic circuits interface with a game computer and passes detection signals to the game computer.

LED1–LED6 are IR light emitting diodes. Each IR light emitting diode illustrated in FIG. 11 as LED1–LED6 may be supplied by a commercially available IR light emitting diode, part number ECG 3017. An IR light emitting diode LED1–LED6 is connected in series with a respective resistor R1–R6. Each resistor illustrated in FIG. 11 as R1–R6 may be supplied by a 330 ohms, ¼ watt rated, 5% variance resistor. Such diode-resistor arrangement, when connected to a +5 VDC power supply, is used as an IR beam transmitter 6 for the target places T1–T6.

IR-sensitive phototransistors Q1–Q6 are each used as a receiving element for an IR beam in a respective target place T1–T6. Each of IR-sensitive phototransistor, illustrated in FIG. 11 as Q1–Q6, may be supplied by a commercially available IR-sensitive phototransistor, part number PT331C. For the present discussion, an IR-sensitive phototransistor Q1 has two terminals. Positive terminal of an IR-sensitive phototransistor Q1 is connected to a node where the negative input terminal of a 339 quad comparator U1 or U2 and one terminal of a resistor R7 is connected. Second terminal of an IR-sensitive phototransistor Q1 is connected to a power supply ground. Likewise, other IR-sensitive phototransistors Q2–Q6 are each connected in a like arrangement.

As discussed, one terminal of resistor R7 is connected with positive terminal of IR-sensitive phototransistor Q1 and negative input terminal of a 339 quad comparator U1 or U2. The second terminal of resistor R7 is connected to a +5 VDC power supply. Each of such resistors as illustrated in FIG. 11 as R7–R12 may be supplied by a 10 Kilo-ohms, ¼ watt rated, 5% variance resistor.

As discussed, a 339 quad comparator U1 or U2 has its negative input terminal connected to an IR-sensitive phototransistor and one terminal of a resistor. For a given 339 quad comparator U1 or U2, its positive input terminal is connected to an output terminal of a respective one of variable resistors R13–R18. A 339 quad comparator output changes state when its input from an IR-sensitive phototransistor exceeds a reference voltage provided through a variable-resistor arrangement. An output voltage from a 339 quad comparator U1 or U2 is an indicating signal as to whether an IR beam has been cut.

339 quad comparators are available in different chip packages U1 and U2. For example, the bottom three 339 quad comparators illustrated in the schematic FIG. 11 may be packaged in a single 339 quad comparator chip U2. The single packaging is illustratively illustrated in a dashed enclosure. Although illustrated as U1 and U2 comparator chips, other available comparator devices may be substituted to perform substantially the same functions.

Variable resistors illustrated in FIG. 11 are designated as R13–R18. Each variable resistor may be supplied by a 10 Kilo-ohm potentiometer. Each variable resistor has its two end terminals connected to a +5 VDC and ground leads of a power source, respectively.

74LS14 inverting hex Schmitt triggers U3 are each used to condition respective 339 quad comparator output. Input terminal of a 74LS14 inverting hex Schmitt trigger U3 is connected to an output terminal of a respective 339 quad comparator U1 or U2 and one terminal of a respective one of resistors R19–R24. Under this arrangement a 74LS14 inverting hex Schmitt trigger U3 conditions input signals which may be slow changing or noisy.

As discussed, one terminal of given one of resistors R19–R24 is connected to an input terminal of a respective 74LS14 inverting hex Schmitt trigger U3 and an output terminal of a respective 339 quad comparator U1 or U2. Second terminal of each of resistors R19–R24 is connected to a +5 VDC power source. Each of resistors R19–R24 may be supplied by a 1 Kilo-ohms resistor.

SWST momentary switches SW1–SW3 are each illustrated in FIG. 11. Two such SWST momentary switches are illustrated in FIG. 3 as push buttons S1 and S2. One terminal of each SWST momentary switch is connected to a +5 VDC power source. Second terminal of each SWST momentary switch is connected to a terminal of a respective one of resistors R25–R27 and input terminal of a respective one of 4050 hex noninverting buffers U5.

As discussed, one terminal of each of resistors R25–R27 is connected to a terminal of a respective SWST momentary switch and input terminal of a respective 4050 hex noninverting buffer U5. Second terminal of each of resistors R25–R27 is connected to a ground source. Each of resistors R25–R27 may be supplied by a 1 Kilo-ohms resistor.

Input terminal of a 4050 hex noninverting buffer U4 is connected to output terminal of a 74LS14 inverting hex Schmitt trigger U3 for circuits leading to outputs D0–D5. For circuits leading to outputs D6–D8, input terminal of a 4050 hex noninverting buffer U5 is connected to a terminal of a respective SWST momentary switch and a terminal of a respective one of resistors R25–R27. Each 4050 hex noninverting buffer output is connected to input terminal of a respective one of TTL drivers D0–D8.

4050 hex noninverting buffers are available in different chip packages U4 and U5. For example, the bottom three 4050 hex noninverting buffers illustrated in the schematic FIG. 11 may be packaged in a single 4050 hex noninverting buffer chip U5. The single packaging is illustratively illustrated in a dashed enclosure. Although illustrated as U4 and U5 buffer chips, other available noninverting buffer devices may be substituted to perform substantially the same functions.

Outputs D0–D8 of TTL drivers may serve to interface a digital body interface apparatus 1 with a game computer. Outputs D0–D8 of TTL drivers may also be designated as leads D0–D8, respectively.

A pair of 5" Slimline™ speakers SPKR1 and SPKR2, each capable of separate audio output, are illustrated in FIG. 11. Speakers SPKR1 and SPKR2 may interface with game audio drivers (not illustrated), and may integrally provide game audio outputs for the digital body interface apparatus 1.

For the circuits illustrated in FIG. 11, there may be three electrical inputs: +5 VDC, GND, and an expansion input. Although not illustratively illustrated, the expansion input may be used to connect to a coin mechanism switch (S3). A coin mechanism switch S3 may provide an electrical input by circuit connection to the expansion input.

There may be nine digital outputs D0–D8 from a digital body interface apparatus 1. Illustratively, digital outputs D0–D5 may each be digital outputs indicating whether an IR beam in a respective one of target places T1–T6 has been cut; digital output D6 may be an output indicating whether push button S1 has been depressed; digital output D7 may be an output indicating whether push button S2 has been depressed; and digital output D8 may be an output indicating the status of the expansion input. The functional attributes of digital outputs D0–D8 are subject to changes and modifications.

The electronic circuit illustrated in FIG. 11 may require a power supply of +5 VDC. The source for the power may be from a game computer. However, a separate external power supply is contemplated.

FIGS. 12A–12G illustrate a preferred embodiment of the infrared sensor of the present invention. Although the sensor of FIG. 5 and 7 may be suitable for use, there are some disadvantages to such a sensor. For example, the sensor will generate a signal when the beam is interrupted, and thus does not require physical contact in order to be tripped. Such physical contact may be useful in a video game which involves boxing, kickboxing, martial arts, or the like. In addition, such sensors, being exposed to the elements, may become blocked by debris, dirt, or the like, or be readily damaged by overenthusiastic users. In addition, such sensors may be 'washed out' by intense sunlight or incandescent light, which acts as light noise to such devices.

Figure 12A:
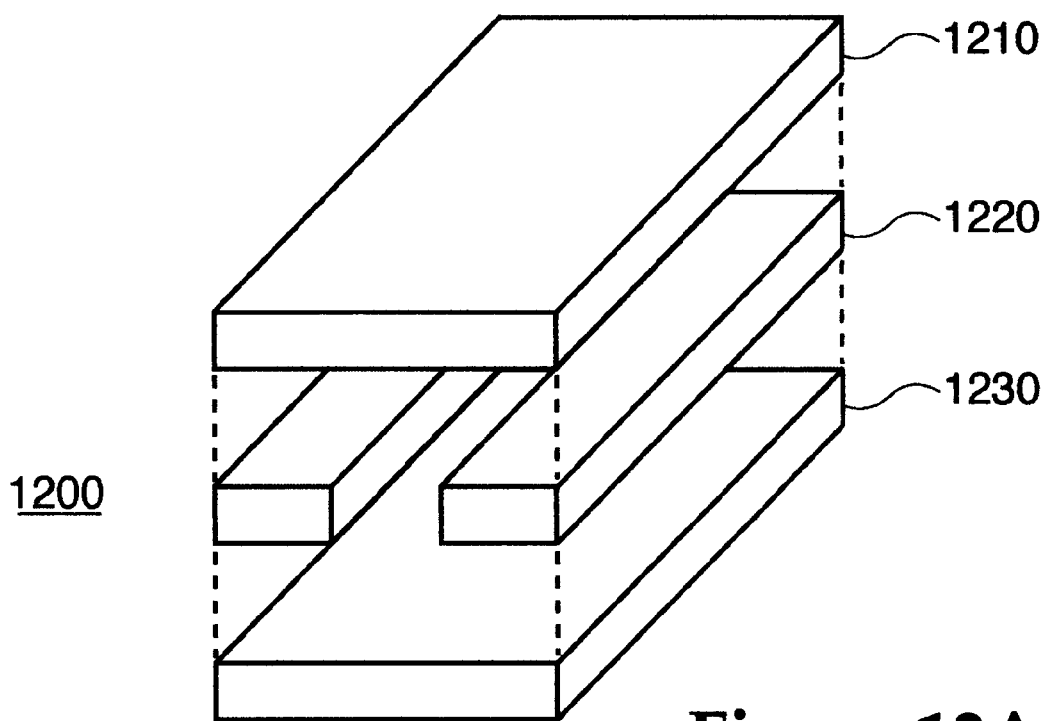
FIG. 12A is an exploded view of the preferred embodiment of the infrared sensor of the present invention.

FIG. 12A is an exploded view of the IR sensor 1200 of the preferred embodiment. Note that IR sensor 1200 may be substituted into the apparatus described in FIGS. 2–11 with little or no modification. The sensor 1200 of FIG. 12A may be readily constructed from three layers of dense foam (e.g., expanded polyurethane, or the like). Layers 1210 and 1230 may be interspersed with layer 1220. Adjacent layers may be joined using suitable adhesive.

Figure 12B:
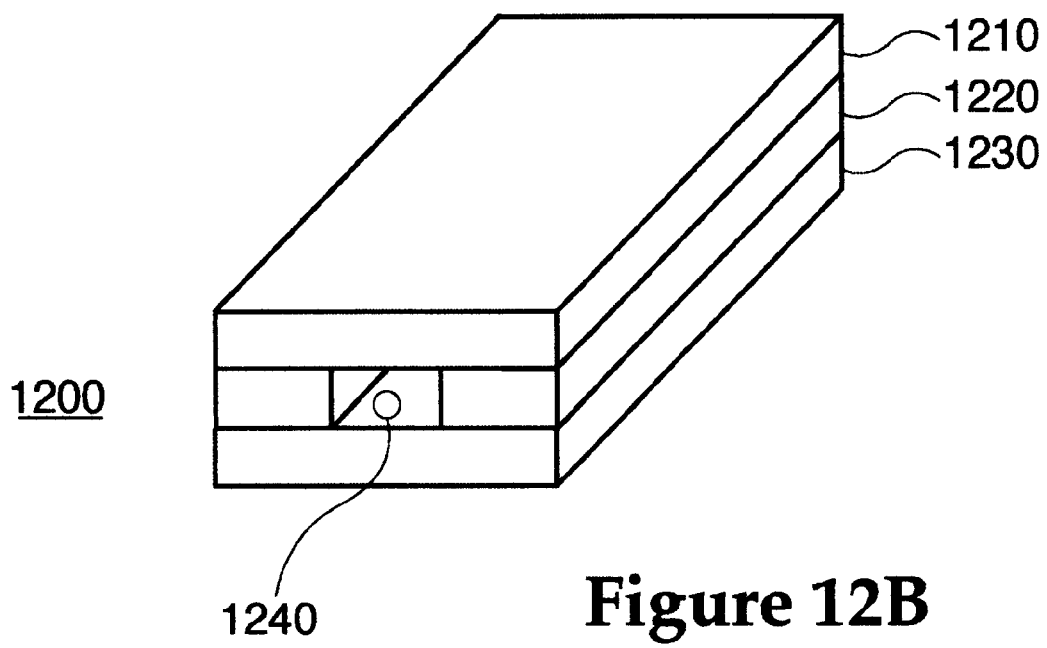
FIG. 12B is a perspective view of the preferred embodiment of the infrared sensor of the present invention.

FIG. 12B is a perspective view of IR sensor 1200 of FIG. 12A. When assembled, foam pieces 1210, 1220, and 1230 form a cavity 1240 extending though the length of IR sensor 1200. Although illustrated as constructed from three pieces 1210, 1220, and 1230, IR sensor 1200 may be constructed from one piece (e.g., molded). In addition, other shapes or sizes may be used (e.g., hollow foam tubing or the like).

Figure 12C:
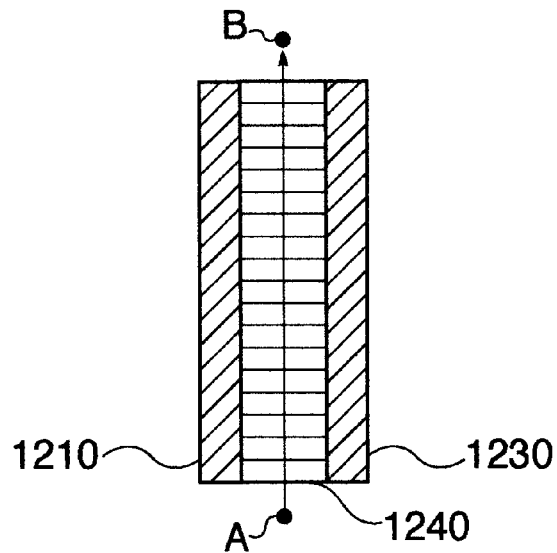
FIG. 12C is a cross sectional view of the preferred embodiment of the infrared sensor of the present invention, illustrating the infrared light beam prior to an impact.

FIG. 12C is a cross sectional view of the preferred embodiment of the infrared sensor of the present invention, illustrating the infrared light beam prior to an impact. A illustrated in FIG. 12C, layers 1210 and 1230 form a cavity 1240 through which a beam of light may travel from point A to point B. Note that cavity 140 may be sealed with an IR sensor located at each end of cavity 140. by sealing cavity 140, ambient light may be excluded from cavity 140, eliminating a source of IR interference.

Figure 12D:
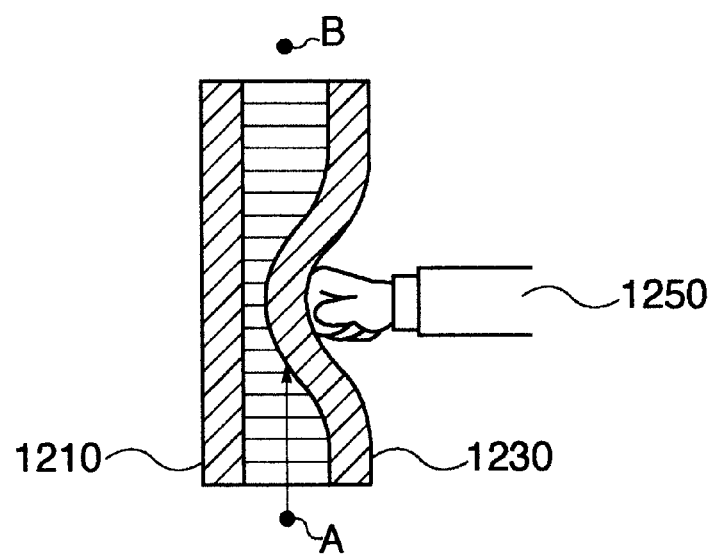
FIG. 12D is a cross sectional view of the preferred embodiment of the infrared sensor of the present invention illustrating the interruption of the light beam when the sensor is struck.

FIG. 12D is a cross sectional view of the preferred embodiment of the infrared sensor of the present invention illustrating the interruption of the light beam when the sensor is struck. Fist 1250 may strike layer 130 to as to compress the layer an interrupt the light path from point A to point B. As noted above, the interruption or attenuation of the light beam may be used to indicate that a hit has been made.

Note that the beam may be partially or fully blocked, and the resultant attenuation of the light beam may be indicative of the intensity of the hit. In addition, interior surfaces of cavity 140 may be lined with reflective materials so that light path from point A to point B may bend around corners and the like, so as to allow three-dimensional shapes for IR sensor 1200. For example, IR sensor 1200 may be shaped in the form of human limbs or the like and formed into a mannequin or dummy.

Figure 12E:
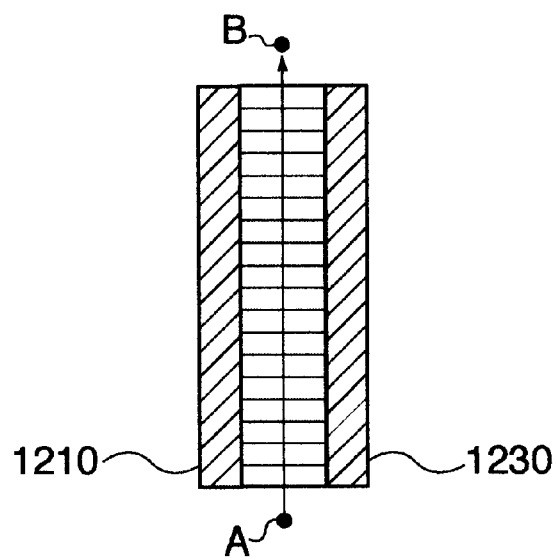
FIG. 12E is a cross sectional view of the preferred embodiment of the infrared sensor of the present invention illustrating the resumption of the light beam after the sensor has been struck and the foam has returned to its original configuration.

FIG. 12E is a cross sectional view of the preferred embodiment of the infrared sensor of the present invention illustrating the resumption of the light beam after the sensor has been struck and the foam has returned to its original configuration. As illustrated in FIG. 12E, one fist 1250 is removed, layer 1230 may rebound into its original position, allowing light to travel from point A to point B. The elasticity of layers 1210, 1220, and 1230 may be adjusted to provide the correct amount of resistance to impacts and provide proper rebound. Additional inserts of elements of polymer, steel, wire, or the like, may be added to provide the proper impact density nd spring-back feature.

Figure 12F:
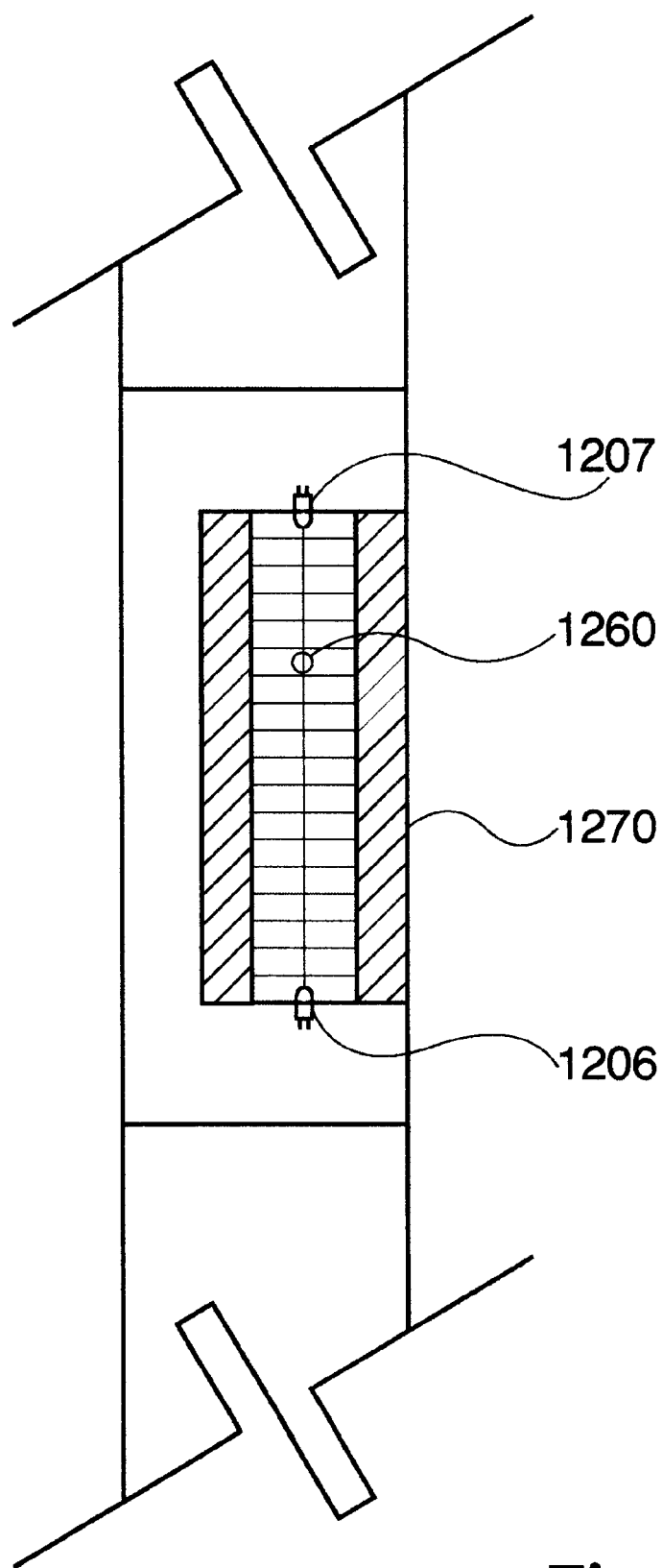
FIG. 12F is a cross sectional view of the preferred embodiment of the infrared sensor of the present invention in the installation of FIG. 5.

FIG. 12F is a cross sectional view of the preferred embodiment of the infrared sensor of the present invention in the installation of FIG. 5. Cross-section view along line A–A' of target place T1 is illustrated in FIG. 12F. As illustrated in FIG. 12F, the IR beam system may comprise an IR transmitter 1206 and an IR receiver 1207 with an IR beam 1260 passing between them. IR transmitter 1206 is illustrated in FIG. 12F as being arbitrarily placed at the bottom of the target place T1. IR receiver 1207 is illustrated in FIG. 12F as being arbitrarily placed at the top of the target place T1. This arrangement is for illustrative purposes only and should not be construed as limiting the spirit and scope of the present invention.

Due to the physical nature of such a video game, IR sensor 1200 may be provided as a modular unit which may be readily removed and replaced when damaged or worn out. When target area 1270 becomes damaged or worn, the entire assembly may be unplugged and removed and replaced with a new assembly.

Figure 12G:
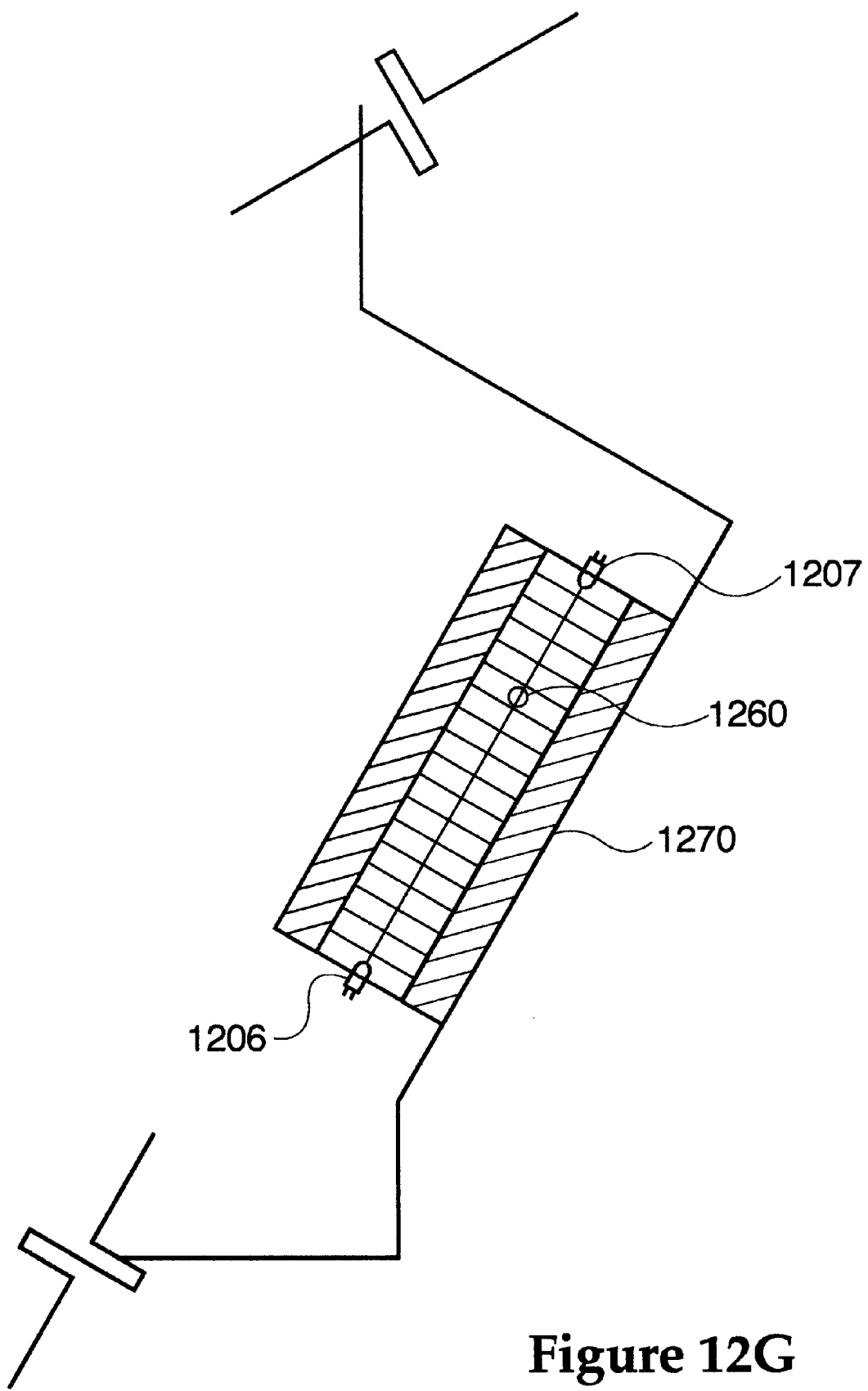
FIG. 12G is a cross sectional view of the preferred embodiment of the infrared sensor of the present invention in the installation of FIG. 7.

FIG. 12G is a cross sectional view of the preferred embodiment of the infrared sensor of the present invention in the installation of FIG. 7. As in FIG. 12F, cross-section view along line C–C' of target place T5 is similarly illustrated in FIG. 12G. As illustrated in FIG. 12G, the IR beam system may similarly comprise an IR transmitter 1206 and an IR receiver 1207 with IR beam 1260 passing between. When target portion 1270 is struck, beam 1260 may be interrupted, indicating a hit has occurred. As before, this arrangement is for illustrative purposes only and should not be construed as limiting the spirit and scope of the present invention.

While the preferred embodiment and various alternative embodiments of the invention have been disclosed and described in detail, it may be apparent to those skilled in the art that various changes in form and detail may be made therein without departing from the spirit and scope thereof.

For example, while illustrated in FIG. 2 utilizing a specific design layout, the digital body interface apparatus 1 may have the sizes, shapes, locations, and quantities of identified elements significantly altered to satisfy ordinary notions of design aesthetics, functions and features, and durability and safety in the course of usage.

Moreover, various modifications may be made within the spirit and scope of the present invention. For example, certain circuit arrangements in FIG. 11 may become available in improved or altered forms and packages, perhaps making possible a reduction in the component count or a miniaturization of a production circuit. Such evolving state-of-the-art may be apparent to one of ordinary skill, and may be within the spirit and scope of the present invention.

What is claimed is:

1. An arcade video game comprising:
    a cabinet for housing the video game;
    a video display for displaying a video image of the game, the video image changing in response to a predetermined program and to a user input signal; and
    at least one digital body interface for receiving a contact from a user and outputting the user input signal, said digital body interface comprising:
    a light transmitter for generating light, and
    a light receiver, for receiving the light and generating a user input signal when the light to the light receiver is at least partially interrupted,
    wherein said light transmitter and said light receiver are positioned within the cabinet so that a contact from the user at least partially interrupts light to the light receiver,
    wherein said digital body interface further comprises:
    an elastomeric portion in the cabinet having cavity formed therein for receiving the light transmitter and the light receiver, said elastomeric portion being at least partially collapsible when contacted by the user so as to at least partially interrupt the light to the light receiver.

2. The video game of claim 1, wherein said elastomeric portion of said digital body interface comprises:
    a first layer of elastomeric foam material as a backing layer;
    a second layer of elastomeric foam material, attached to the first layer of elastomeric foam material and having a channel portion therethrough; and
    a third layer of elastomeric foam material, attached to the second layer of elastomeric foam material and sandwiching the second layer of elastomeric foam material between the third layer of elastomeric foam material and the first layer of elastomeric foam material such that the channel portion forms a cavity within the digital body interface.

3. The arcade video game of claim 2, further comprising:
a schmitt trigger, coupled to the digital body interface, for generating a user input signal when a signal received from the light receiver passes a predetermined threshold value.

4. The arcade video game of claim 3 further comprising:
an alternate user input means for receiving user inputs and generating user input signals.

5. The arcade video game of claim 4, wherein said user input means comprises at least one pushbutton.

6. The arcade video game of claim 1, wherein said video game comprises a martial arts type video game, and said at least one digital body interface comprises a plurality of digital body interfaces for receiving striking blows from a user, generating user input signals in response to the striking blows, and altering the video image on the video display in response to the user input signals, wherein the video image depicts martial arts combat.

7. The arcade video game of claim 1, wherein said video game comprises a boxing type video game, and said at least one digital body interface comprises a plurality of digital body interfaces for receiving striking blows from a user, generating user input signals in response to the striking blows, and altering the video image on the video display in response to the user input signals, wherein the video image depicts boxing.

8. A digital body interface comprising:
an elastomeric portion having cavity formed therein;
a light transmitter, generating light into the cavity of the elastomeric portion; and
a light receiver, receiving light generated by the light transmitter,
wherein said elastomeric portion is at least partially collapsible when contacted by the user so as to at least partially interrupt the light from the light transmitter to attenuate the light received by the light receiver.

9. The digital body interface of claim 8, wherein said elastomeric portion comprises:
a first layer of elastomeric foam material as a backing layer;
a second layer of elastomeric foam material, attached to the first layer of elastomeric foam material and having a channel portion formed therethrough; and
a third layer of elastomeric foam material, attached to the second layer of elastomeric foam material and sandwiching the second layer of elastomeric foam material between the third layer of elastomeric foam material and the first layer of elastomeric foam material such that the channel portion forms the cavity within the digital body interface.

10. The digital body interface of claim 8, further comprising:
a schmitt trigger, coupled to the light receiver interface, for generating a user input signal when a signal received from the light receiver passes a predetermined threshold value.

11. A method operating an arcade video game comprising the steps of:
displaying a video image on a video display provided in a video game cabinet in response to a predetermined program and to a user input signal,
generating light from a light transmitter within a digital body interface provided in the video game cabinet, and
receiving the light in a light receiver and generating the user input signal when at least a portion of the light to the light receiver is interrupted,
wherein said steps of generating and receiving light further comprise the steps of:
generating the light with the light transmitter mounted in a first portion of a cavity of an elastomeric portion attached to the cabinet,
receiving the light in the light receiver mounted in a second portion of the cavity of the elastomeric portion, spaced apart from the first portion,
at least partially collapsing the cavity of the elastomeric portion in response to a blow by the user to attenuate the light to the receiver, and
generating a user input signal in response to attenuation of the light to the light receiver.

12. The method of claim 11, further comprising the steps of:
generating, with a schmitt trigger coupled to the light receiver, a user input signal when a signal from the light receiver passes a predetermined threshold.

13. The arcade video game of claim 1, wherein said digital body interface further comprises:
an elastomeric portion having cavity formed therein for receiving the light transmitter and the light receiver, said elastomeric portion being at least partially collapsible when contacted by the user so as to interrupt the light to the light receiver;
wherein said video game comprises a martial arts type video game, and said at least one digital body interface comprises a plurality of digital body interfaces for receiving striking blows from a user, generating user input signals in response to the striking blows, and altering the video image on the video display in response to the user input signals, wherein the video image depicts martial arts combat.

14. The arcade video game of claim 1, wherein said digital body interface further comprises:
an elastomeric portion having cavity formed therein for receiving the light transmitter and the light receiver, said elastomeric portion being at least partially collapsible when contacted by the user so as to interrupt the light to the light receiver;
wherein said video game comprises a boxing type video game, and said at least one digital body interface comprises a plurality of digital body interfaces for receiving striking blows from a user, generating user input signals in response to the striking blows, and altering the video image on the video display in response to the user input signals, wherein the video image depicts boxing.

15. The arcade video game of claim 1, wherein said digital body interface further comprises:
an elastomeric portion having cavity formed therein for receiving the light transmitter and the light receiver, said elastomeric portion being at least partially collapsible when contacted by the user so as to interrupt the light to the light receiver, said elastomeric portion of said digital body interface comprising:
a first layer of elastomeric foam material as a backing layer;
a second layer of elastomeric foam material, attached to the first layer of elastomeric foam material and having a channel portion therethrough; and a third layer of elastomeric foam material, attached to the second layer of elastomeric foam material and sandwiching the second layer of elastomeric foam material between the third layer of elastomeric foam material and the first layer of elastomeric foam material such that the channel portion forms a cavity within the digital body interface, wherein said video game comprises a martial arts type video game, and said at least one digital body interface comprises a plurality of digital body interfaces for receiving striking blows from a user, generating user input signals in response to the striking blows, and altering the video image on the video display in response to the user input signals, wherein the video image depicts martial arts combat.

16. The arcade video game of claim 1, wherein said digital body interface further comprises:

an elastomeric portion having cavity formed therein for receiving the light transmitter and the light receiver, said elastomeric portion being at least partially collapsible when contacted by the user so as to interrupt the light to the light receiver, said elastomeric portion of said digital body interface comprising:

a first layer of elastomeric foam material as a backing layer;

a second layer of elastomeric foam material, attached to the first layer of elastomeric foam material and having a channel portion therethrough; and a third layer of elastomeric foam material, attached to the second layer of elastomeric foam material and sandwiching the second layer of elastomeric foam material between the third layer of elastomeric foam material and the first layer of elastomeric foam material such that the channel portion forms a cavity within the digital body interface, wherein said video game comprises a boxing type video game, and said at least one digital body interface comprises a plurality of digital body interfaces for receiving striking blows from a user, generating user input signals in response to the striking blows, and altering the video image on the video display in response to the user input signals, wherein the video image depicts boxing.

* * * * *